United States Patent
Siomina et al.

(10) Patent No.: US 9,894,634 B2
(45) Date of Patent: Feb. 13, 2018

(54) METHODS FOR ENHANCING POSITIONING MEASUREMENTS WITH MULTI-ANTENNA TRANSMISSION SCHEMES

(71) Applicant: Telefonaktiebolaget L M Ericsson (publ), Stockholm (SE)

(72) Inventors: Iana Siomina, Solna (SE); Muhammad Kazmi, Bromma (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 360 days.

(21) Appl. No.: 14/378,153

(22) PCT Filed: Dec. 16, 2013

(86) PCT No.: PCT/SE2013/051514
§ 371 (c)(1),
(2) Date: Aug. 12, 2014

(87) PCT Pub. No.: WO2015/026278
PCT Pub. Date: Feb. 26, 2015

(65) Prior Publication Data
US 2015/0257121 A1   Sep. 10, 2015

Related U.S. Application Data

(60) Provisional application No. 61/868,345, filed on Aug. 21, 2013.

(51) Int. Cl.
| | |
|---|---|
| H04W 24/00 | (2009.01) |
| H04W 64/00 | (2009.01) |
| G01S 5/02 | (2010.01) |
| G01S 5/26 | (2006.01) |

(52) U.S. Cl.
CPC ........ *H04W 64/003* (2013.01); *G01S 5/0226* (2013.01); *G01S 5/26* (2013.01)

(58) Field of Classification Search
CPC .................................................. H04W 64/003
See application file for complete search history.

(56) References Cited

U.S. PATENT DOCUMENTS

| | | | |
|---|---|---|---|
| 2010/0260154 A1* | 10/2010 | Frank | G01S 5/10 370/336 |
| 2011/0207477 A1 | 8/2011 | Siomina et al. | |
| 2012/0015667 A1 | 1/2012 | Woo et al. | |
| 2013/0223626 A1* | 8/2013 | Edge | H04W 4/06 380/270 |

(Continued)

OTHER PUBLICATIONS

International Search Report for International application No. PCT/SE2013/051514, dated Jul. 23, 2014, 3 pages.

(Continued)

*Primary Examiner* — Justin Lee
(74) *Attorney, Agent, or Firm* — Sage Patent Group

(57) ABSTRACT

A method in a wireless device may support positioning with different antenna transmission schemes. An antenna transmission scheme used by at least one cell on whose radio signals the wireless device performs a positioning measurement may be determined. A measurement procedure may be adapted to compensate for potential measurement error associated with the antenna transmission scheme. Related methods in positioning servers and radio network nodes are also discussed.

30 Claims, 7 Drawing Sheets

Positioning architecture in LTE (does not cover UL positioning).

(56) References Cited

U.S. PATENT DOCUMENTS

| | | | | |
|---|---|---|---|---|
| 2013/0271324 | A1* | 10/2013 | Sendonaris | G01S 5/02 |
| | | | | 342/450 |
| 2013/0294266 | A1* | 11/2013 | Lim | H04W 24/10 |
| | | | | 370/252 |
| 2015/0018010 | A1* | 1/2015 | Fischer | H04W 4/023 |
| | | | | 455/456.2 |
| 2015/0124713 | A1* | 5/2015 | Salhov | H01Q 3/2605 |
| | | | | 370/329 |

OTHER PUBLICATIONS

Written Opinion of the International Searching Authority for International application No. PCT/SE2013/051514, dated Jul. 23, 2014, 5 pages.

Ericsson: "Co-existence between adjacent FDD and TDD bands" 3GPP TSG-RAN WG4 Meeting #66 St. Julian's, Malta, Jan. 28-Feb. 1, 2013; R4-130680; 12 pages.

3GPP TS 36.211 V10.3.0 (Sep. 2011) $3^{rd}$ Generation Partnership Project; Technical Specification Group Radio Access Network; Evolved Universal Terrestrial Radio Access (E-UTRA); Physical Channels and Modulation (Release 10); 650 Route des Lucioles, Sophia Antipolis, Valbonne, France; 103 pages, Sep. 2011.

Huawei, HiSilicon: "New SI proposal: Positioning enhancements for E-UTRA", 3 GPP TSG-RAN Meeting #60, Oranjestad, Aruba, Jun. 11-14, 2013; RP-130680; 5 pages.

* cited by examiner

Positioning architecture in LTE (does not cover UL positioning).

Positioning subframe allocation in time for a single cell.

Example antenna configurations.

Communicate capability indicative of its ability to deal with any one or more of the below:
1) Capability of performing positioning measurements on cells with different transmission schemes or specific transmission schemes;
2) Capability of performing positioning measurements on cells with different transmission time characteristics or specific transmission time characteristics;
3) Capability of autonomously determining the antenna transmission scheme used in a cell; and
4) Capability of applying a compensation or adaptation to compensate an error in a positioning measurement performed on a cell using certain antenna transmission scheme.

Communicate to another node any one or more of the below:
1) Whether any type of adaptation in measurement procedure is applied to a positioning measurement or not;
2) whether the compensation has been applied e.g. signal strength compensation;
3) whether the measurement has taken into account the antenna transmission scheme used in the cell on whose signal the positioning measurement is done by the UE; and
4) Amount of compensation applied (e.g. time error compensation value = +2 Ts) to the reported positioning measurement.

METHODS FOR ENHANCING POSITIONING MEASUREMENTS WITH MULTI-ANTENNA TRANSMISSION SCHEMES

CROSS REFERENCE TO RELATED APPLICATION

This application is a 35 U.S.C. § 371 national stage application of PCT International Application No. PCT/SE2013/051514, filed in the English language on 16 Dec. 2013, which itself claims the benefit of U.S. provisional Patent Application No. 61/868,345, filed 21 Aug. 2013, the disclosures and contents of both of which are incorporated by reference herein in their entirety.

TECHNICAL FIELD

Present embodiments relate to wireless communication networks and in particular to the networks where positioning is exercised with multi-antenna systems.

BACKGROUND

There are a large number of antenna transmission schemes in Long-Term Evolution (LTE). The network node may use any of the different antenna schemes available in cells. Furthermore the antenna schemes may also be different in different cells. The network may also transmit the radio signals used for positioning measurements by the User Equipment (UE) via more than one antenna in a cell. The positioning measurement such as Observed Time Difference of Arrival (OTDOA) Reference Signal Time Difference (RSTD) is performed in several cells (e.g., 16 cells). However the UE is not aware of the antenna scheme used in neighboring cells. This in turn degrades the positioning measurement performance and may even lead to failure of positioning.

Positioning Overview

Several positioning methods for determining the location of the target device, which can be a UE, mobile relay, PDA (Personal Digital Assistant), etc. exist. Known methods include:

Satellite based methods, which use A-GNSS (e.g., Assisted Global Navigation Satellite System, Assisted Global Positioning System, A-GPS, etc.) measurements to determine UE position;

OTDOA, which uses UE RSTD measurement to determine UE position in LTE;

UTDOA (Uplink Time Difference of Arrival), which uses measurements done at LMU to determine UE position;

Enhanced cell ID, which uses one or more of UE Rx-Tx (Receive-Transmit) time difference, BS (Base Station) Rx-Tx time difference, LTE P/RSRQ, HSPA (High Speed Packet Access) CPICH (Common Pilot Channel) measurements, angle of arrival (AoA), etc. for determining UE position; and Hybrid methods, which use measurements from more than one method for determining UE position.

In LTE, the positioning node (also known as E-SMLC, Evolved Serving Mobile Location Center, SLP, or Secure User Plane Location (SUPL) Location Platform, or location server) configures the UE, eNodeB, or LMU (Location Measurement Unit) to perform one or more positioning measurements. The positioning measurements are used by the UE, positioning node (also referred to as a positioning server), or another node to determine the UE location. The positioning node communicates with UE and eNodeB in LTE using LPP (LTE Positioning Protocol) and LPPa protocols.

Positioning Architecture in LTE

The three key network elements in an LTE positioning architecture are the LCS (Location Services) Client, the LCS target, and the LCS Server. The LCS Server is a physical or logical entity managing positioning for a LCS target device by collecting measurements and other location information, assisting the terminal in measurements when necessary, and estimating the LCS target location. A LCS Client is a software and/or hardware entity that interacts with a LCS Server to obtain location information for one or more LCS targets, (i.e., the entities being positioned). LCS Clients may also reside in the LCS targets themselves. An LCS Client sends a request to LCS Server to obtain location information, and the LCS Server processes and serves the received requests and sends the positioning result and optionally a velocity estimate to the LCS Client. A positioning request can be originated from the terminal or a network node or an external client.

Position calculation can be conducted, for example, by a positioning server (e.g., typically E-SMLC or SLP in LTE, although there is also a possibility to configure other nodes as positioning servers) or the UE. The former approach corresponds to the UE-assisted positioning mode, while the latter corresponds to the UE-based positioning mode.

Two positioning protocols operating via the radio network exist in LTE, LPP and LPPa. The LPP is a point-to-point protocol between a LCS Server and a LCS target device, used to position the target device. LPP can be used both in the user and control plane, and multiple LPP procedures are allowed in series and/or in parallel thereby reducing latency. LPPa is a protocol between eNodeB and LCS Server specified only for control-plane positioning procedures, although it still can assist user-plane positioning by querying eNodeBs for information and eNodeB measurements. SUPL (Secure User Plane Location) protocol is used as a transport for LPP in the user plane. LPP also has a possibility to convey LPP extension messages inside LPP messages, e.g., OMA (Open Mobile Alliance) LPP extensions (LPPe) to allow, e.g., for operator-specific assistance data or assistance data that cannot be provided with LPP or to support other position reporting formats or new positioning methods.

A high-level architecture, as it is currently standardized in LTE, is illustrated in FIG. 1, where the LCS target is a terminal, and the LCS Server is an E-SMLC or an SLP. In the figure, the control plane positioning protocols with E-SMLC as the terminating point are shown as LPP, LPPa, and LCS-AP, and the user plane positioning protocol is shown as SUPL/LPP and SUPL. SLP may comprise two components, SPC (SUPL Positioning Center) and SLC (SUPL Location Center), which may also reside in different nodes. In an example implementation, SPC has a proprietary interface with E-SMLC, and Llp interface with SLC, and the SLC part of SLP communicates with P-GW (PDN-Gateway) and External LCS Client.

Additional positioning architecture elements may also be deployed to further enhance performance of specific positioning methods. For example, deploying radio beacons is a cost-efficient solution which may significantly improve positioning performance indoors and also outdoors by allowing more accurate positioning, for example, with proximity location techniques.

OTDOA Positioning

The OTDOA positioning method makes use of the measured timing of downlink signals received from multiple eNodeBs at the UE. The UE measures the timing of the received signals using assistance data received from the LCS server, and the resulting measurements are used to locate the UE in relation to the neighbouring eNodeBs.

With OTDOA, a terminal measures the timing differences for downlink reference signals received from multiple distinct locations. For each (measured) neighbor cell, the UE measures Reference Signal Time Difference (RSTD) which is the relative timing difference between neighbor cell and the reference cell.

The UE position estimate is then found as the intersection of hyperbolas corresponding to the measured RSTDs. At least three measurements from geographically dispersed base stations with a good geometry are needed to solve for two coordinates of the terminal and the receiver clock bias. In order to solve for position, precise knowledge of the transmitter locations and transmit timing offset is needed.

To enable positioning in LIE and facilitate positioning measurements of a proper quality and for a sufficient number of distinct locations, new physical signals dedicated for positioning (positioning reference signals, or PRS [3GPP TS 36.211, V10.3.0, September 2011, 103 pages]) have been introduced and low-interference positioning subframes have been specified in 3GPP ($3^{rd}$ Generation Partnership Project).

PRS are transmitted from one antenna port (R6) according to a pre-defined pattern [3GPP TS 36.211]. A frequency shift, which is a function of Physical Cell Identity (PCI), can be applied to the specified PRS patterns to generate orthogonal patterns and model the effective frequency reuse of six, which makes it possible to significantly reduce neighbour cell interference on the measured PRS and thus improve positioning measurements. Even though PRS have been specifically designed for positioning measurements and in general are characterized by better signal quality than other reference signals, the standard does not mandate using PRS. Other reference signals, e.g., cell-specific reference signals (CRS) could in principle also be used for positioning measurements.

PRS (positioning reference signals) are transmitted in pre-defined positioning subframes (e.g., having a period of N subframes) grouped by several consecutive subframes ($N_{PRS}$), i.e., one positioning occasion (including $N_{PRS}=6$ consecutive subframes) as shown in FIG. 2 (illustrating a positioning subframe allocation in time for a single cell). Positioning occasions occur periodically with a certain periodicity of N subframes, i.e., the time interval between two positioning occasions. The standardized periods N are 160, 320, 640, and 1280 ms, and the number of consecutive subframes may be 1, 2, 4, or 6 [3GPP TS 36.211].

Multi-Antenna Systems

The multiple input multiple output (MIMO) technique is an advanced antenna technique to improve the spectral efficiency and thereby boost the overall system capacity. MIMO implies that both the base station and the UE employ multiple antennas. MIMO techniques are widely studied and applied in practice for downlink communications, i.e., from the base station to the mobile terminal. Several MIMO techniques which are well-known and used in practical systems are explained below.

Irrespective of the MIMO technique the notation (M×N) is generally used to represent MIMO configuration in terms of number of transmit (M) and receive antennas (N). The common MIMO configurations used or currently discussed for various technologies are: (2×1), (1×2), (2×2), (4×2), (8×2) and (8×4). The configurations represented by (2×1) and (1×2) are special cases of MIMO that correspond to transmit diversity and receiver diversity, respectively. The configuration (2×2) will be used in WCDMA release 7.

The Evolved UMTS (Universal Mobile Telecommunications System) Terrestrial Radio Access Network (E-UTRAN) downlink will indeed support several MIMO schemes including MIMO techniques including Single-User MIMO, SU-MIMO, and Multi-User MIMO, MU-MIMO.

The MIMO technology has also been widely adopted in other wireless communication standards, e.g., IEEE802.16.

The above mentioned MIMO modes or other MIMO techniques enable some sort of spatial processing of the transmitted and received signals. This ability of spatial diversity in general improves spectral efficiency, extends cell coverage, enhances user data rate, mitigates multi-user interference, etc. In essence each MIMO technique has its own benefit. For example, receiver diversity (1×2) may improve coverage. On the other hand (2×2) MIMO (such as D-TxAA) may lead to increase peak user bit rate.

In general, a (2×2) MIMO scheme may double the data rate. The possibility to double the data rate depends on whether the channel is sufficiently uncorrelated so that the rank of the (2×2) MIMO channel matrix is 2 (the rank is the number of independent rows or columns of the matrix). In general, with (2×2) MIMO the average data rate will be lower than 2 times the data rate achieved in single link conditions.

Different possible multi-antenna techniques can be applied, for example, beamforming or antenna switching. Depending on whether the receiving eNodeB is equipped with multiple receiving antennas, transmit diversity (2 transmit antennas, 1 receiving antenna) or MIMO (2×2) will be discussed. Moreover, the scheme can be open loop or closed loop. Open loop multi-antenna techniques are based on the assumption that the base station (BS) does not have information about the downlink, DL channel, so that the base station cannot exploit this knowledge in order to improve/optimize the transmission weights (the transmission beamforming) to steer the beam in the direction of the UE. On the contrary, in case of closed loop multi-antenna techniques, the BS has some information about the DL channel which it can exploit to optimize/improve the beamforming vector.

Transmit Diversity

Transmit diversity is a special type of multi-antenna transmission when the signal is transmitted from different antennas to achieve better spatial, angular and temporal diversities.

The most common transmit diversity consists of two transmit antennas. The signals from two or more transmit diversity antennas may be transmitted in different manners in terms of phases, amplitude, power, etc. This gives rise to different DL transmit diversity schemes. Some well-known schemes are:

Transmit beamforming open loop;
Transmit beamforming closed loop;
Switched antenna DL transmit diversity open loop;
Switched antenna DL transmit diversity closed loop; and
Space-time transmit diversity It should be noted that transmit diversity can be regarded as a special case of the well-known, multiple input multiple output (MIMO) transmission scheme, which can also be used in the DL. Embodiments described herein for DL transmit diversity can be extended or applied to any MIMO scheme, and vice versa.

In any MIMO or transmit diversity scheme, a set of parameters related to MIMO or DL transmit diversity are regularly adjusted by the BS. The objective is to ensure that the DL transmission incorporates the desired spatial, temporal or angular diversities. This may in turn improve DL coverage, reduce interference, increase downlink bit rate, enable BS to lower its transmitted power, to mention some advantages.

The MIMO or transmit diversity parameters may comprise any one or more of: antenna set, relative phase, relative amplitude, relative power, relative frequency, timing, absolute or total power of signals transmitted on transmit diversity branches, etc.

Furthermore, MIMO or any transmit diversity scheme can be used in any technology including LTE, WCDMA or GSM. For instance in LTE, the switched antenna uplink transmit diversity is standardized in LTE release 8.

Problems with Existing Solutions

One or more of the following problems may arise with existing solutions:

- A UE performing measurements for positioning may not be aware of the antenna transmission scheme used at the BS transmitting radio signals used by the UE for positioning measurements. In particular the UE may have no information or very limited information about the antenna transmission scheme used in neighbor cells. Therefore the UE can make incorrect assumptions about the channel for different received signal samples which may in turn lead to degraded measurement quality (e.g., due to non-optimal accumulation). The positioning measurements (e.g., RSTD) are performed mostly on neighbor cells.
- A BS transmitting radio signals for positioning may not be aware of whether all or some UEs support a certain transmission scheme for these signals and/or for positioning measurements. Such a BS may unaware of a quality of positioning measurements generated by a UE.
- Positioning node assisting UE in performing positioning measurements by providing assistance data may not be aware of the transmission scheme used by a BS or UE's ability to support such transmission scheme for the radio signals used for positioning or for positioning measurements.

The approaches described in this Background section could be pursued, but are not necessarily approaches that have been previously conceived or pursued. Therefore, unless otherwise expressly stated herein, the approaches described in this Background section are not prior art to the claims in this application and are not admitted to be prior art by inclusion in this section.

SUMMARY

According to some embodiments, a method in a wireless device may support positioning with different antenna transmission schemes. The method may include determining an antenna transmission scheme used by at least one cell on whose radio signals the wireless device performs a positioning measurement. A measurement procedure may be adapted to compensate for potential measurement error associated with the antenna transmission scheme.

Accordingly, positioning measurements for wireless devices may be improved where different antenna transmission schemes may be used.

According to some other embodiments, a method in a network node, e.g., a positioning server, for supporting positioning when different antenna transmission schemes can be used may include determining an antenna transmission scheme of a radio node, where the antenna transmission scheme is applied to transmit radio signals to be used for positioning. The determined antenna transmission scheme may be used to perform positioning computations and/or configuring positioning measurements.

According to still other embodiments, a method in a radio network node supporting positioning with different antenna transmission schemes may include receiving wireless device capability related to the wireless device support of antenna transmission schemes for positioning and/or receiving an antenna transmission scheme configuration from a network node different than the radio node. An antenna transmission scheme for positioning measurements may be adaptively configured.

According to more embodiments, a wireless device may be capable of supporting positioning with different antenna transmission schemes. The wireless device may include a transceiver configured to communicate with a radio network node, and a processor circuit coupled to the transceiver. The processor circuit may be configured to execute computer program instructions to determine an antenna transmission scheme used by at least one cell on whose radio signals the wireless device performs a positioning measurement, and adapt a measurement procedure to compensate for potential measurement error associated with the antenna transmission scheme.

According to still more embodiments, a network node, such as a positioning server, may be capable of supporting positioning when different antenna transmission schemes can be used. The positioning service may include a processor circuit configured to execute computer program instructions to determine an antenna transmission scheme of a radio node where the antenna transmission scheme is applied to transmit radio signals to be used for positioning, and use the determined antenna transmission scheme to perform positioning computations.

According to still other embodiments, a radio network node may be capable of supporting positioning with different antenna transmission schemes. The radio network node may include a transceiver configured to communicate with a wireless device, and a processor circuit coupled to the transceiver. The processor circuit may be configured to execute computer program instructions to receive wireless device capability related to the wireless device support of antenna transmission schemes for positioning and/or receive an antenna transmission scheme configuration from a network node different than the radio node, and adaptively configure an antenna transmission scheme for positioning measurements.

Accordingly, positioning measurements for wireless devices may be improved where different antenna transmission schemes may be used. For example, a risk of UE measurement failure or positioning error due to not taking into account the transmission scheme for positioning used by the transmitting radio node may be reduced. Moreover, positioning accuracy may be increased, regulatory requirements for positioning may be more readily achieved, and/or use of multi-antenna systems for positioning may be provided/improved.

BRIEF DESCRIPTION OF THE DRAWINGS

The accompanying drawings, which are included to provide a further understanding of the disclosure and are incorporated in and constitute a part of this application, illustrate certain non-limiting embodiment(s). In the drawings:

FIGS. 6-9 are a flowcharts of operations and methods that are performed by a UE according to some embodiments disclosed herein;

DETAILED DESCRIPTION

Figure 1:
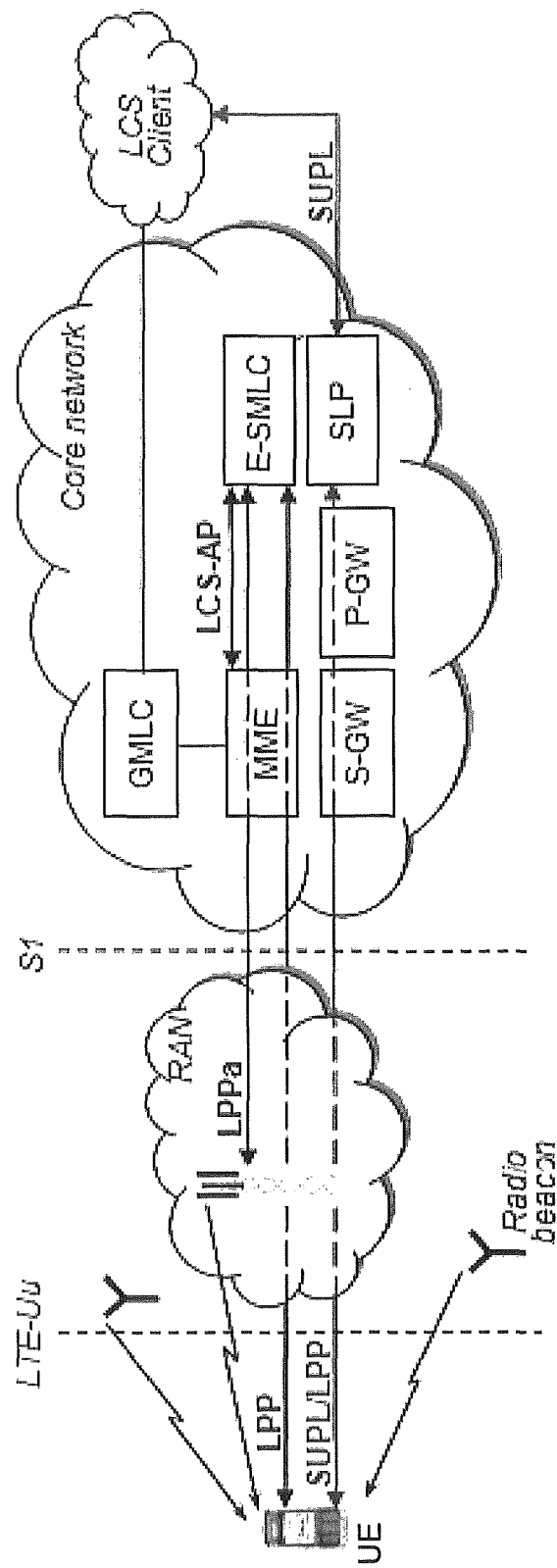
FIG. 1 is a block diagram of a positioning architecture for a LTE system that can be configured to operate according to some embodiments disclosed herein.
Figure 2:
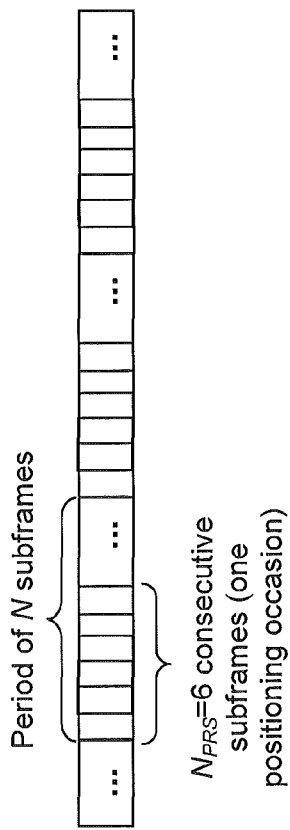
FIG. 2 illustrates a positioning subframe allocation in time for a single cell.

In the following detailed description, numerous specific details are set forth to provide a thorough understanding of present embodiments. However, it will be understood by those skilled in the art that the present embodiments may be practiced without these specific details. In other instances, well-known methods, procedures, components and circuits have not been described in detail so as not to obscure present embodiments. It is intended that all embodiments disclosed herein can be implemented separately or combined in any way and/or combination.

Some of the embodiments disclosed herein include:

Methods in a UE for supporting positioning (e.g., performing measurements for positioning, determining a positioning result, etc.) when different antenna transmission schemes are possible to use for transmitting the measured radio signals, wherein supporting comprises any one or more of:

Determining antenna transmission schemes in at least one cell;

Applying an adaptation to compensate for a potential error due to the antenna transmission scheme; and Informing a network node about type and amount of applied compensation to the positioning measurement.

Methods in a transmitting node to adaptively configure transmission schemes for positioning measurements to enhance positioning measurement accuracy.

Methods in a positioning server (e.g., E-SMLC or another node configured as a positioning server) for supporting positioning when different transmission schemes are possible to use for transmitting radio signals measured for positioning.

1. Detailed Description of Various Embodiments

A radio node is characterized by its ability to transmit and/or receive radio signals and it may comprise a transmitting or receiving antenna. A radio node may be a UE or a radio network node (see corresponding descriptions).

A wireless device and UE are used interchangeably in the description. A UE may comprise any device equipped with a radio interface and capable of at least transmitting or receiving a radio signal from another radio node. A UE may also be capable of receiving a signal and demodulating it. Note that even some radio network nodes, e.g., femto base station (BS) (also referred to as home BS), may also be equipped with a UE-like interface. Some examples of "UE" that are to be understood in a general sense are a personal digital assistant (PDA), laptop, mobile, a tablet device, sensor, fixed relay, mobile relay, any radio network node equipped with a UE-like interface (e.g., small radio base station (RBS), eNodeB, femto BS).

A radio network node is a radio node comprised in a radio communications network. A radio network node may be capable of receiving radio signals or transmitting radio signals in one or more frequencies, and may operate in single-(radio access technology (RAT)), multi-RAT or multi-standard mode (e.g., MSR). A radio network node, including eNodeB, RRH (Remote Radio Head), RRU (Remote Radio Unit), relay, LMU (Location Measurement Unit), or transmitting-only/receiving-only radio network nodes, may or may not create own cell. Some examples of radio network nodes not creating own cell are beacon devices transmitting configured radio signals or measuring nodes receiving and performing measurements on certain signals (e.g., LMUs). It may also share a cell or the used cell ID with another radio node which creates own cell, it may operate in a cell sector or may be associated with a radio network node creating own cell. More than one cell or cell sectors (commonly named in the described embodiments by a generalized term "cell" which may be understood as a cell or its logical or geographical part) may be associated with one radio network node. Further, one or more serving cells (in DL and/or UL) may be configured for a UE, e.g., in a carrier aggregation system where a UE may have one Primary Cell (PCell) and one or more Secondary Cells (SCells). A cell may also be a virtual cell, e.g., characterized by a cell ID but not providing a full cell-like service, associated with a transmit node.

A network node may be any radio network node (see the corresponding description) or core network node. Some non-limiting examples of a network node are an eNodeB (also radio network node), RNC (Radio Network Controller), positioning node, MME (Mobility Management Entity), PSAP (Public Safety Answering Point), SON (Self Organizing Network) node, MDT (Minimization of Drive Tests) node, coordinating node, a gateway node (e.g., P-GW or S-GW or LMU gateway or femto gateway), and Operations & Maintenance (O&M) node.

The term "coordinating node" used herein is a network node, which coordinates radio resources with one or more radio nodes. Some examples of the coordinating node are network monitoring and configuration node, OSS (Operational Support Systems) node, O&M, MDT node, SON node, positioning node, MME, a gateway node such as Packet Data Network Gateway (P-GW) or Serving Gateway (S-GW) network node or femto gateway node, a macro node coordinating smaller radio nodes associated with it, eNodeB coordinating resources with other eNodeBs, etc.

The signaling described herein may be either physical-layer signaling or higher-layer (e.g., Layer 2 or Layer 3) signaling, and it may be via direct links or logical links (e.g., via higher layer protocols and/or via one or more network and/or radio nodes). For example, signaling from a coordinating node to a UE may also pass another network node, e.g., a radio network node.

Embodiments disclosed herein are not limited to LTE, but may apply with any Radio Access Network (RAN), single- or multi-RAT. Some other RAT examples are LTE-Advanced, Universal Mobile Telecommunications System (UMTS), High Speed Packet Access (HSPA), GSM, cdma2000, WiMAX, and WiFi.

Embodiments disclosed herein also apply to multi-point transmission and/or reception systems, carrier aggregation systems, and multi-point carrier aggregation systems.

The term "subframe" used in the embodiments described herein (typically related to LTE) is an example resource in the time domain, and in general it may be any pre-defined time instance or time period.

Downlink positioning measurement herein is any positioning measurement involving measuring at least one downlink radio signal, e.g., Positioning Reference Signal (PRS). In one example, the measurement may also involve measuring an uplink radio signal, e.g., as with two-directional measurements such as UE Rx-Tx, eNB (eNodeB or Base Station) Rx-Tx, RTT, etc. In another example, the measurement may also involve measuring a second radio signal on a second downlink, e.g., RSTD measurement which is a time difference of two signals over two downlinks.

Figure 3:
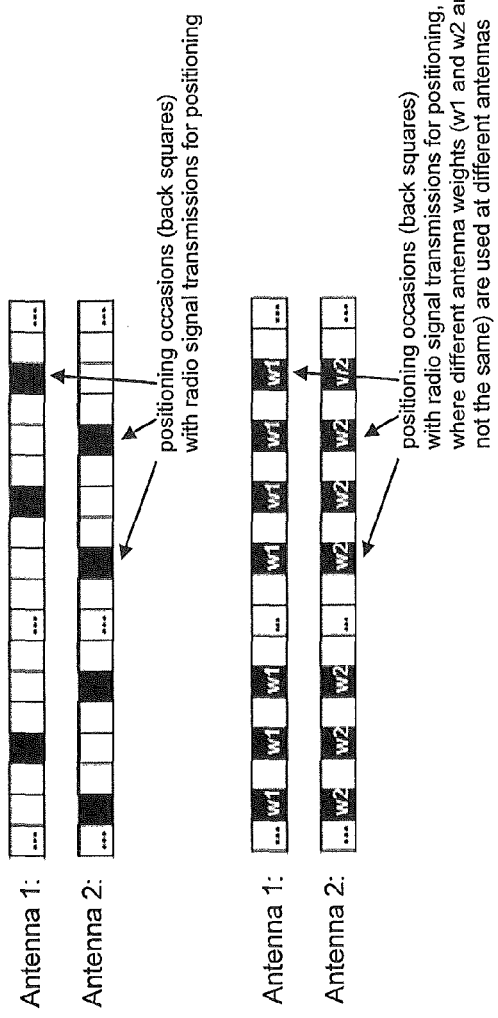
FIG. 3 illustrates example antenna configurations including indicated positioning occasions (black squares) with radio signal transmissions for positioning, and where different antenna weights w1 and w2 (i.e., w1 and w2 are not the same) may be used at different times.

The term transmission scheme herein may comprise a transmission scheme (e.g., MIMO scheme, transmit diversity, transmit beamforming open loop, transmit beamforming closed loop, switched antenna DL transmit diversity open loop, switched antenna DL transmit diversity closed loop, space-time transmit diversity, etc.) or transmission characteristics (e.g., transmit time difference, transmit time delay and/or error, time alignment error for the transmitting antennas, etc.). Configuring or adapting (e.g., by a transmitting radio node or positioning node) a transmission scheme (which may also comprise transmission time characteristic) may further comprise any one or more of:

- Configuring (controlling) a set of transmitting antennas;
- Configuring (controlling) time and/or frequency resources for the transmitting antennas of the multi-antenna system (see, e.g., FIG. 3);
- Configuring (controlling) absolute or relative transmit power levels of the antennas or antenna weights in the transmission scheme (see, e.g., FIG. 3); the antennas weights may be the same or different for different antennas; the antenna weights for transmissions in positioning occasions (time instances) and/or for transmission of radio signals for positioning may be different from the weights for non-positioning transmissions and/or outside positioning occasions;
- Configuring (controlling) direction of the transmit antennas;
- Configuring (controlling) antenna pattern or antenna radiation for the transmit antennas;
- Configuring (controlling) at least one beam characteristic of the transmit antennas; and
- Configuring (controlling) a transmission timing delay for at least one of the transmit antennas, where the delay is intended to compensate for a distance between the antennas.

1.1 Methods in UE for Supporting Positioning with Different Antenna Transmission Schemes According to one embodiment, a UE adapts its positioning measurement procedure to a transmission scheme used for transmitting radio signals used by the UE for the measurements. In one example, the measurement is a timing measurement, e.g., Reference Signal Time Difference (RSTD), Time Difference of Arrival (TDOA), Time of Arrival (TOA), Rx-Tx, Round Trip Time (WIT), etc.

Figure 6:
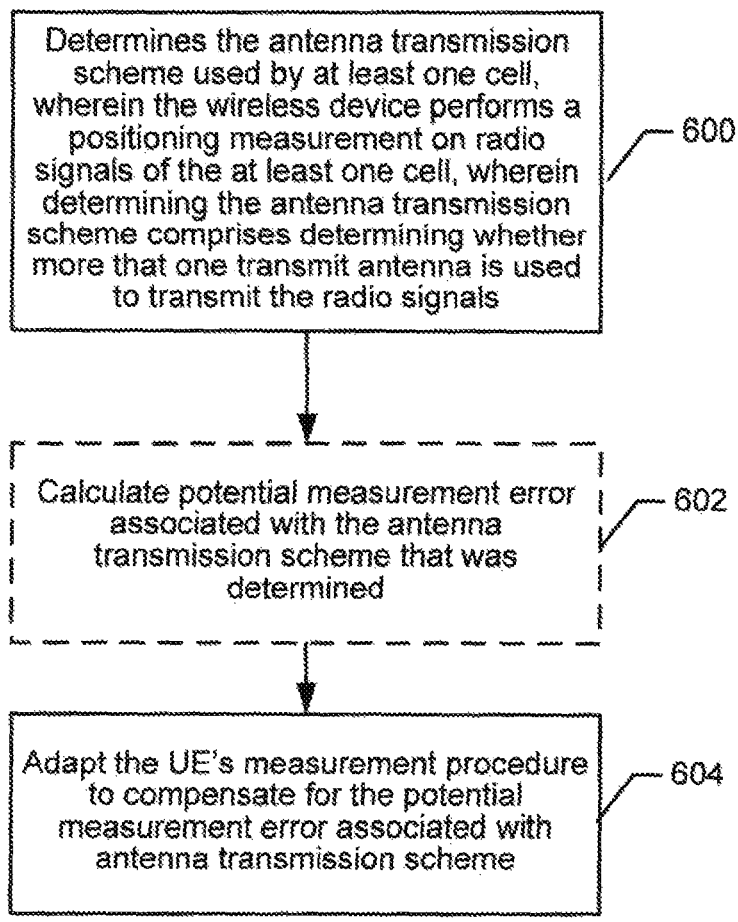

With reference to the flowchart of FIG. 6, in one step the UE determines (block 600) the antenna transmission scheme used by each cell on whose radio signal/signals (e.g., periodically transmitted positioning reference signals, PRS) the UE performs a positioning measurement. For example, the UE may determine whether more than one transmit antenna is used to transmit the radio signal used by the wireless device for the positioning measurement. In another step, the UE adapts (block 604) its measurement procedure to compensate for the potential measurement error associated with antenna transmission scheme. Adapting the measurement procedure may include at least one of applying compensation to a positioning measurement, combining two or more samples or measurement components to be used for a positioning measurement, and/or signaling information associated with the determined antenna transmission scheme to a network node. Moreover, adapting the measurement procedure may include adapting a positioning measurement to meet at least one pre-defined positioning measurement requirement associated with the antenna transmission schemes. Between the steps of determining the antenna transmission scheme and adapting the measurement procedure, the UE may further perform an optional step of calculating (block 602) potential measurement error associated with the antenna transmission scheme that was determined.

1.1.1 Determination of Antenna Transmission Scheme by UE

The UE may determine a transmission scheme (used by the transmitting node or which the UE may assume for adapting its measurement procedure), where an antenna transmission scheme may also comprise a transmission time characteristic and the determination may be in one or more ways below, e.g., based on:

- Explicit or implicit indication in higher-layer or lower-layer signaling received from another node (e.g., eNodeB, core network node, positioning node, another UE, etc.) indicative of the transmission scheme of one or more transmit nodes transmitting radio signals measured for positioning or indicative of whether the transmission scheme of the transmitting node is the same or different from that of another node;
- Explicit or implicit indication of transmission time difference between different antennas of the multi-antenna system, where the indication may be
  - received via higher-layer or lower-layer signaling from another node (eNodeB, core network node, positioning node, another, etc.)
  - determined based on a pre-defined rule (e.g., based on antenna type);
- Autonomous determination based on measurements or analysis of the delay spread of radio signals or the number of strong correlation peaks where a correlation peak may be indicative of more than one signal (transmitted from different antennas) arriving at different times;
- By association with a transmission scheme used for other radio signals (e.g., when the number of CRS (Cell Specific Reference Signal) ports is 1, then it is most likely that multi-antenna transmissions are not used by that node); and
- Implicit determination, e.g., based on,
  - a pre-defined rule, e.g., if multiple antennas are used then a certain transmission scheme is used to transmit a certain type(s) of radio signals for positioning measurements. For example, PRS transmitted on different antennas are staggered in time when Tx diversity is used in a cell.

Historical data. For example, UE may store information related to antenna transmission scheme used in different cells i.e., cell IDs (identifications) and the transmission scheme. When UE detects a cell then it determines the antenna transmission scheme based on the stored data.

1.1.2 Adaptation of Measurement Procedure by UE

The UE first may decide whether to adapt or not to adapt its measurement procedure. Alternatively, the UE may always adapt its measurement procedure whenever it determines that a certain multi-antenna transmission scheme is used in a cell on whose signal the UE performs positioning measurement.

For example, the decision may be whether a compensation to a positioning measurement should be applied or not. With reference to the flowchart of FIG. 7, the UE may determine (block 700) whether or not to adapt its positioning measurement procedure based on any one or more of the following factors:

radio conditions: apply compensation if channel delay spread is above a threshold, e.g., 1 μs (microsecond) or more.

UE speed: apply compensation if UE speed is above a threshold, e.g., 30 km/hr or more perceived measurement accuracy: apply compensation if the measurement accuracy of the performed measurement is worse than a threshold for the given BW, e.g., RSTD accuracy of measured RSTD is worse than +/−5 Ts for 10 MHz.

Transmission bandwidth, e.g., UE applies compensation only when BW is below a threshold (e.g., below 5 MHz). Examples of BW (bandwidth) are:

Transmission BW of cell

PRS transmission BW

PRS BW indicated in the OTDOA assistance information to the UE

According to Pre-defined rules, e.g.,

UE applies compensation for certain antenna transmission schemes, e.g., transmit diversity;

UE applies compensation for certain type of positioning measurement, e.g., OTDOA time difference of arrival such as RSTD;

Responsive to explicit indication received from the network node, e.g., indicating when and for which cell the UE should apply compensation or for which ones UE should not apply compensation.

The degree of proximity or distance to the node or antennas transmitting the radio signals.

Figure 7:
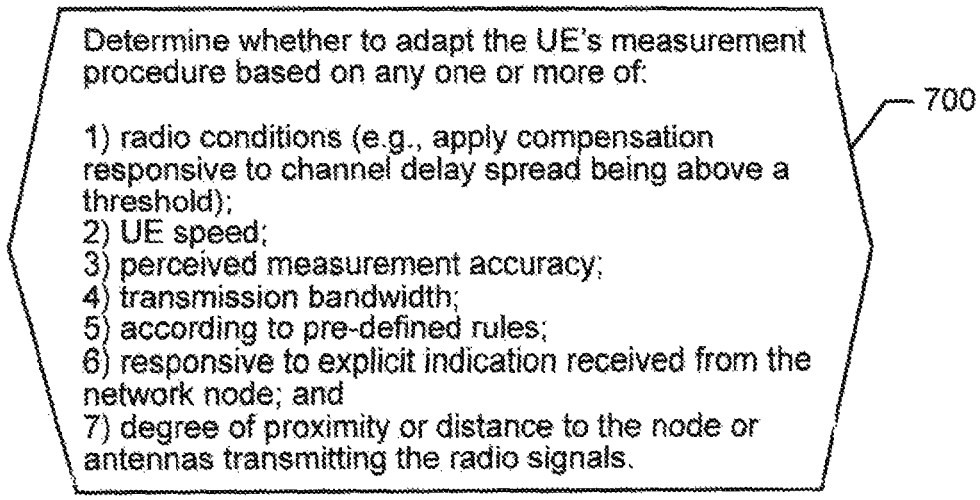

The operations of block 604 of FIG. 6 may therefore be conditionally performed responsive to the determination of block 700 of FIG. 7, in accordance some embodiments disclosed herein.

1.1.2.1 Examples of Adaptations Applied by UE to Measurement Procedure

In one example, the adaptation (e.g., block 604 of FIG. 6) may comprise any one or more of:

Applying, adaptively to a transmission scheme, a compensation to the measurement or a measurement component or sample (e.g., a timing compensation Δτ (delta tau), signal strength compensation, pathloss compensation, etc.), where a measurement component may be a received signal in a specific time instance (e.g., every second positioning occasion)

The amount of compensation may be calculated on-line, selected from a set of pre-defined or pre-configured values, received via higher-layer or lower-layer signaling from the network node, etc.

Selecting, adaptively to a transmission scheme, a combining method for two or more samples or measurement components to be used for the measurement, e.g., deciding (e.g., selecting) a combining method (e.g., coherent or non-coherent combining), and/or deciding absolute or relative weights corresponding to different samples;

deciding whether or not to combine certain samples; and deciding sample grouping where different groups may be associated with different antennas or with a set of antennas transmitting with a time difference below a threshold.

Using a certain type(s) of receiver to perform positioning measurements. For example, if a multi-antenna transmission scheme is used then UE may select an enhanced receiver. The enhanced receiver enables the UE to receive DL signals with larger delay spread (e.g., 1 microsecond/μs or more) from the cell employing multi-antenna transmission scheme.

Adapting receiver parameters, e.g., adjusting the search window size or shifting it in time to receive signals from one or more antennas when there is a time offset/delay between transmissions from multiple antennas.

1.2 Method in UE of Signaling Information Associated with Antenna Transmission Scheme to Other Nodes 1.2.1 Method in UE of Signaling Determined Antenna Scheme As disclosed in the embodiment in Section 1.1, the UE may implicitly or explicitly determine the antenna transmission scheme used in a certain cell. The UE may store the information about the determined antenna transmission schemes used in one or more cells. The information may typically comprise one or more of:

Cell ID of the cell and/or antenna identification;

Antenna transmission scheme identity, which is pre-defined; and

Type of signal transmission used in the cell, e.g., PRS transmission.

The UE may use the stored historical information in the future when, for example, doing measurements on these cells.

The UE may also log this information as part of the MDT measurement logging procedure. In this case the UE may also store the location and time instant when the antenna transmission scheme is determined.

In addition the UE signals the information associated with the determined transmission scheme to another node, e.g., positioning node, another UE, eNodeB, etc.

1.2.2 Method in UE of Signaling Capability of Handling Positioning Measurement with Different Antenna Transmission Scheme In yet another embodiment illustrated in FIG. 8, the UE communicates, signals, (block 800) to another node (e.g., positioning node, another UE, eNodeB, etc.) its capability indicative of its ability to deal with any one or more of the below:

Capability of performing positioning measurements on cells with different transmission schemes or specific transmission schemes, Capability of performing positioning measurements on cells with different transmission time characteristics or specific transmission time characteristics (e.g., when the transmission time difference for two transmit antennas or physical/logical antenna ports is above a threshold), Capability of autonomously determining the antenna transmission scheme used in a cell, Capability of applying a compensation or adaptation to compensate an error in a positioning measurement performed on a cell using a certain antenna transmission scheme. The UE may also inform the type(s) of adaptation that it can apply to a positioning measurement performed on a cell using certain antenna transmission scheme.

The UE may send the above mentioned capability information to the network node (e.g., eNodeB or positioning node) or another UE using any one or more of the following operations:

Proactive reporting without receiving any explicit request from the network node (e.g., serving or any target network node);

Reporting upon receiving any explicit request from the network node (e.g., serving or any target network node); and The explicit request can be sent to the UE by the network anytime or at any specific occasion. For example, the request for the capability reporting can be sent to the UE during initial setup or after a cell change (e.g., handover, RRC connection re-establishment, RRC connection release with redirection, PCell change in CA, PCC change in PCC, etc.).

The network node, e.g., serving eNode B, BS, positioning node, relay, RNC, BSC, MME, may use the received UE capability information to, for example, perform one or more radio operational tasks related to measurement, positioning, configuration of parameters. In general the network node may initiate the relevant procedure supported by the UE. For example, if the UE can apply compensation to a positioning measurement then the network node may not apply any further compensation to the measurement results reported by the UE.

The node receiving the capability may also forward the received UE capability information to another UE or a network node, e.g., to neighboring radio network node, SON, etc. This may reduce/avoid a need for the UE to again signal its capability to a new serving radio node after the cell change, e.g., after handover. In this way signaling overheads can be reduced.

1.2.3 Method in UE of Signaling Information about Adaptation

In yet another embodiment illustrated in FIG. 9, the UE may communicate, signal, (block 900) to inform another node (e.g., positioning node, another UE, eNodeB, etc.) in the positioning measurement report or in a separate message about any one or more of:

Whether any type of adaptation in measurement procedure is applied to a positioning measurement or not. The UE may also inform the type of adaptation applied to the positioning measurement, e.g., adaptation of receiver, timing error compensation, whether the compensation has been applied, e.g., signal strength compensation, whether the measurement has taken into account the antenna transmission scheme used in the cell on whose signal the positioning measurement is done by the UE, Amount of compensation applied (e.g., time error compensation value=+2 Ts) to the reported positioning measurement.

Figure 10:
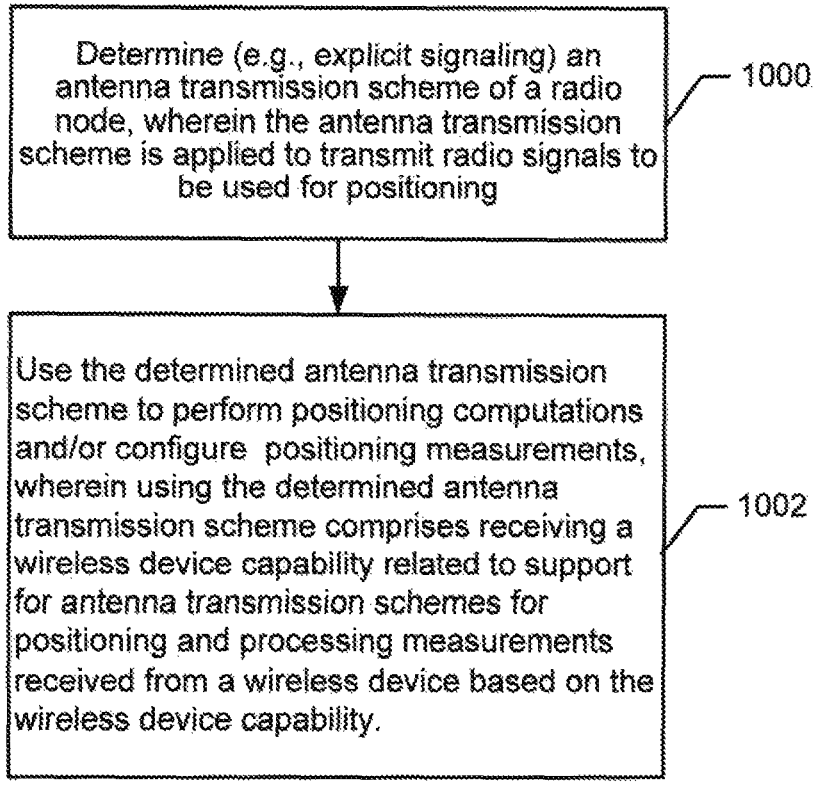
FIG. 10 is a flow chart of operations and method performed by a positioning server according to some embodiments disclosed herein.

1.3 Methods in a Positioning Server (e.g., E-SMLC or Another Network Node Configured as a Positioning Server) to Support Positioning when Different Transmission Schemes can be Used Referring to another embodiment in FIG. 10, a positioning server (or other network node) performs any one or more of the following:

Determine (e.g., explicit signaling) (block 1000) a transmission scheme of a radio node, where the transmission scheme is applied to transmit radio signals to be used for positioning;

Use the determined transmission scheme information to perform positioning (block 1002) computations, e.g., by any one or more of:

Signaling this information to another node (e.g., UE, another measuring node, another transmitting radio node)

Building up or adapting positioning assistance data (e.g., configuring in the assistance data one or more of: the radio signal bandwidth, signals periodicity, number of positioning subframes in a positioning occasion, etc.)

Apply a compensation to the measurement received from the UE

In another embodiment, the positioning node may also receive the UE capability related to support for transmission schemes for positioning. Based on the capability, positioning node may further process the received UE measurements, depending on the received capability.

1.4 Methods in a Transmitting Radio Network Node (Also Referred to as a Transmitting Radio Node and/or a Transmitting Node) to Support Positioning with Different Transmission Schemes The embodiments in the subsections below may also be combined with each other in any way and/or combination.

1.4.1 Transmission Scheme Adaptation

Figure 11:
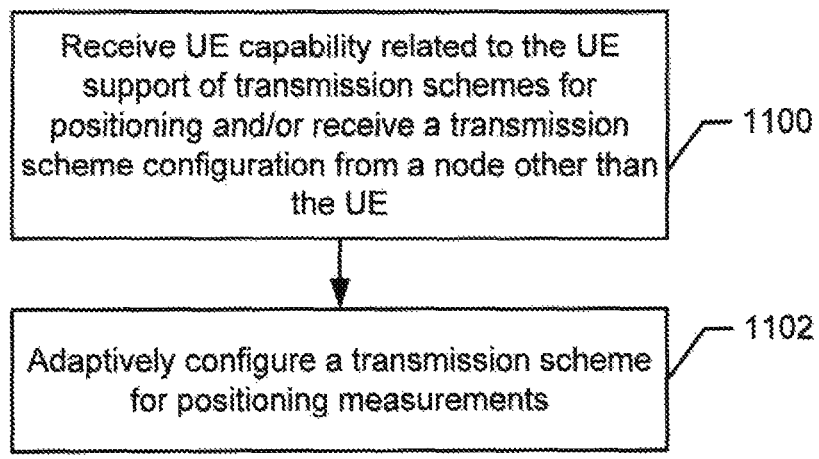
FIGS. 11-12 are flowcharts of operations and methods performed by a radio network node according to some embodiments disclosed herein.

According to another embodiment herein that is illustrated in FIG. 11, a transmitting radio network node adaptively configures (block 1102) a transmission scheme for positioning measurements. In one embodiment, prior to performing the adaptation (block 1102), the transmitting radio network node may also receive (block 1100) UE capability related to the support of transmission schemes for positioning. The wireless device capability may include at least one of a capability of performing positioning measurements on cells with different antenna transmission schemes or specific antenna transmission schemes, a capability of performing positioning measurements on cells with different transmission time characteristics or specific transmission time characteristics due to differences in transmission times between transmit antennas, a capability of autonomously determining an antenna transmission scheme used in a cell, and/or a capability of applying a compensation or adaptation to compensate an error in a positioning measurement performed on a cell using a certain antenna transmission scheme. In another embodiment, prior to the adaptation the transmitting radio network node may receive (block 1100) from another node a transmission scheme configuration and/or an instruction to adapt/configure/reconfigure transmission scheme for positioning. Positioning assistance data may be adapted based on the received device capability.

Figure 12:
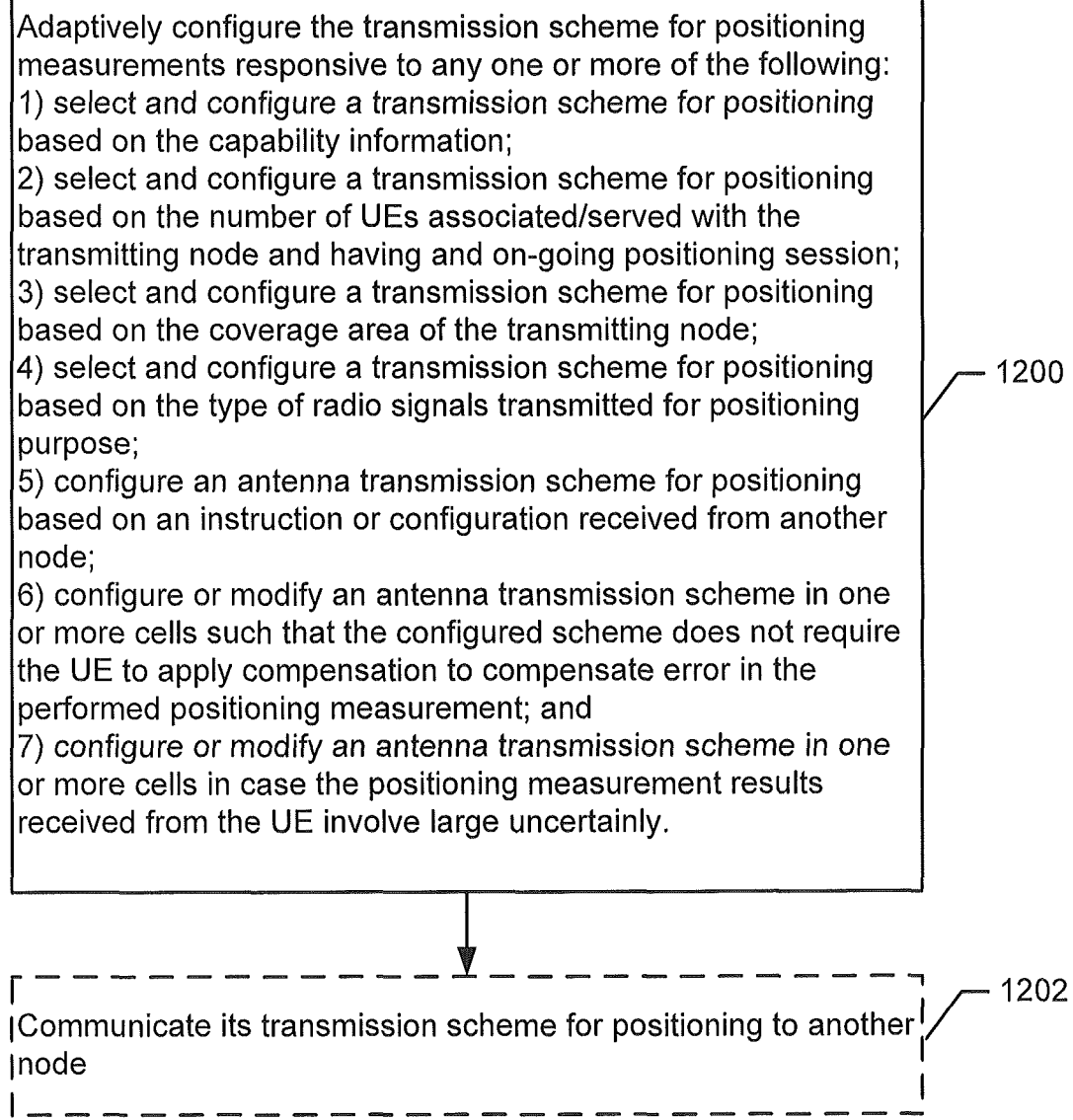

Referring to FIG. 12, the adaptation (e.g., block 1102 of FIG. 11) (see also the beginning of Section 1) may further comprise (block 1200), e.g., any one or more of:

Selecting and configuring a transmission scheme for positioning based on the capability information (e.g., block 1100 of FIG. 11) (see Section 1.1 on UE capability related to support transmission schemes for positioning) of one UE, most of UEs, at least a certain number of UEs, or all UEs;

Selecting and configuring a transmission scheme for positioning based on the number (or its estimate if the exact number is not known) of UEs associated/served with the transmitting node and having an on-going positioning session;

Selecting and configuring a transmission scheme for positioning based on the coverage area of the transmitting node, e.g., a multi-antenna transmission in a smaller area and single-antenna transmission in a larger area;

Selecting and configuring a transmission scheme for positioning based on the type of radio signals transmitted for positioning purposes;

Configuring an antenna transmission scheme for positioning based on an instruction or configuration received from another node, e.g., from positioning node or another radio node;

Configuring or modifying an antenna transmission scheme in one or more cells such that the configured scheme does not require the UE to apply compensation to compensate error in the performed positioning measurement; and Configuring or modifying an antenna transmission scheme in one or more cells in case the positioning measurement results received from the UE involve large uncertainly, e.g., more than +/−8 Ts for RSTD measurement.

1.4.2 Signaling of the Transmission Scheme to Another Node

In other embodiments, the transmitting radio network node may communicate/signal, (block 1202 of FIG. 12) its transmission scheme for positioning to another node (e.g., another eNodeB via X2, positioning node via LPPa, UE via RRC, etc.).

1.5 Pre-Defined Rules Enabling Positioning Measurements with Different Antenna Transmission Schemes In some embodiments one or more pre-defined rules may be defined to assist the UE in performing measurement and meeting pre-defined requirements.

The pre-defined requirements for positioning measurements are specified in 3GPP specifications and their compliance by the UE is ensured by means of conformance testing procedures. Examples of such pre-defined requirements (also known as measurement requirements, performance requirements, RRM requirements, etc.) related to position measurements are RSTD measurement time, measurement reporting delay, measurement reporting time, measurement accuracy, number of cells on which positioning measurements are required to be performed by the UE over certain measurement time (e.g., 16 cells for RSTD measurements), applicable signal quality target for measuring a cell (e.g., neighbor cell PRS signal quality such as −13 dB), etc.

Examples of such pre-defined rules are any one or more of:

The pre-defined requirements associated with the positioning measurement to be met by the UE depend upon the antenna transmission schemes used in cells on which the UE performs the positioning measurement. For example, the measurement period may be longer for a certain transmission scheme than for another transmission scheme and/or accuracy may depend on a transmission scheme or a requirement may apply only for certain transmission scheme(s).

The UE is required to meet pre-defined requirements associated with the positioning measurement (e.g., RSTD) provided the same antenna transmission scheme is used in cells on which the UE performs positioning measurement, e.g., same antenna scheme on reference cell and neighbor cell on which OTDOA RSTD is measured by the UE.

The UE is allowed to relax pre-defined requirements associated with the positioning measurement if different antenna transmission schemes are used in cells on which the UE performs positioning measurement. The relaxing requirement can be extending a measurement period of RSTD measurement. As indicated above, the relaxing may be controlled by another requirement or it may be autonomous by the measuring UE.

The UE is allowed to relax pre-defined requirements associated with the positioning measurement if different antenna transmission schemes are used in cells on which the UE performs positioning measurement provided certain condition(s) are met. The relaxing requirement can be extending a measurement period of RSTD measurement or having larger inaccuracy of RSTD measurement. Examples of one or more conditions which are to be met for relaxing requirements are:

If the received signal quality of the cell on which measurement is done by the UE is below a threshold, e.g., below −10 dB of PRS signal quality for RSTD measurement;

If the BW of the cell on which measurement is done by the UE is below a threshold, e.g., below 5 MHz for RSTD measurement;

If the BW of PRS transmitted by a cell on which measurement is done by the UE is below a threshold, e.g., below 25 RBs (Resource Blocks) for RSTD measurement;

If the PRS BW of a cell indicated in OTDOA assistance information and on which measurement is done by the UE is below a threshold, e.g., below 25 RBs for RSTD measurement.

If different antenna transmission schemes are used in cells on which the UE performs positioning measurement then UE meets pre-defined requirements associated with the positioning measurement according to a rule. An example of rule is that UE meets requirements corresponding to certain antenna scheme. For example, a certain antenna scheme can be the one that leads to worse requirements, i.e., least stringent requirements such as longest measurement delay and/or worse measurement accuracy of RSTD measurement.

2.0 Potential Advantages of One or More Embodiments Disclosed Herein

No or reduced risk of UE measurement failure or positioning error due to not taking into account the transmission scheme for positioning used by the transmitting radio node.

Increased positioning accuracy.

Enable meeting regulatory requirements for positioning.

Possibility to exploit multi-antenna systems for positioning.

3.0 Example User Equipment Node and Network Node Configurations

Figure 4:
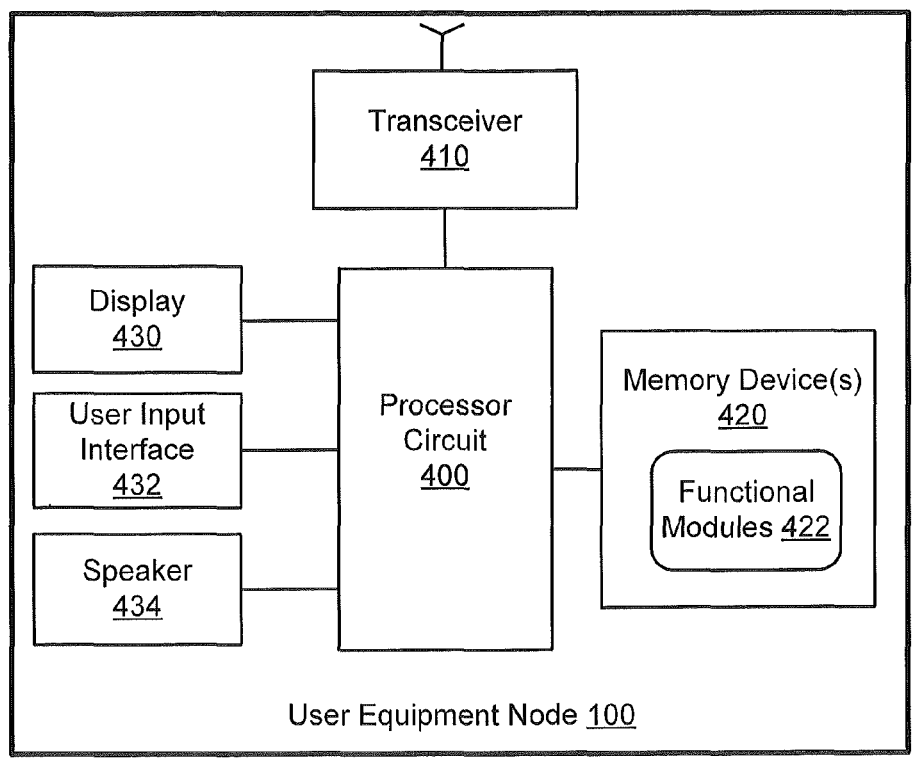
FIG. 4 is a block diagram of a UE that is configured according to some embodiments disclosed herein.

FIG. 4 is a block diagram of the user equipment (UE) 100 that is configured according to some embodiments. The UE 100 includes a transceiver 410, a processor circuit 400, and a memory device(s) 420 containing functional modules 422. The UE 100 may further include a display 430, a user input interface 432, and a speaker 434.

The transceiver 410 (e.g., LTE or other cellular transceiver, Bluetooth transceiver, WiFi transceiver, WiMax transceiver, etc.) is configured to communicate with a radio network node. The processor circuit 400 may include one or more data processing circuits, such as a general purpose and/or special purpose processor (e.g., microprocessor and/or digital signal processor). The processor circuit 400 is configured to execute computer program instructions from the functional modules 422 of the memory device(s) 420, described below as a computer readable medium, to perform at least some of the operations and methods described herein as being performed by a UE.

Figure 5:
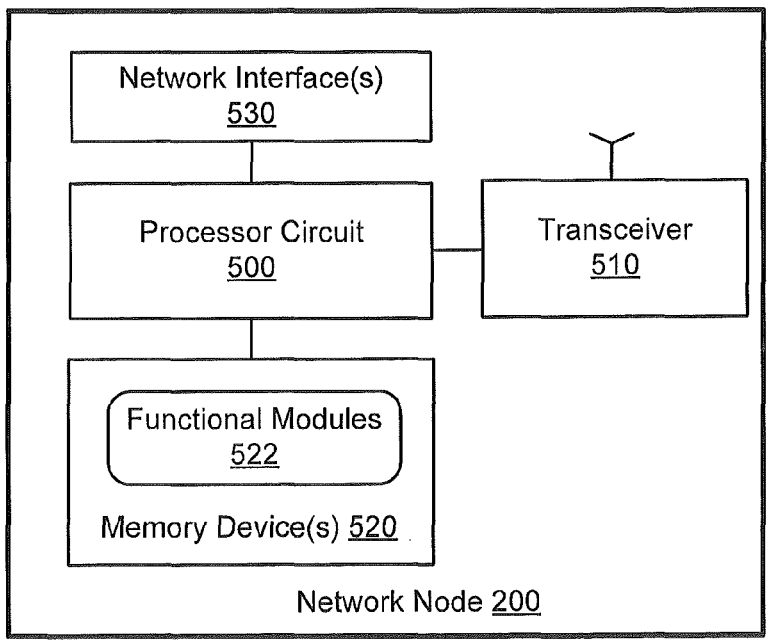
FIG. 5 is a block diagram of a network node that is configured according to some embodiments disclosed herein.

FIG. 5 is a block diagram of a network node 200 that is configured according to some embodiments. The network node 200 includes a transceiver 510, a network interface(s) 530, a processor circuit 500, and a memory device(s) 520 containing functional modules 522.

The transceiver 510, e.g., LIE or other cellular transceiver, Bluetooth transceiver, WiFi transceiver, WiMax transceiver, is configured to communicate with the UE 100. The processor circuit 500 may include one or more data processing circuits, such as a general purpose and/or special purpose processor (e.g., microprocessor and/or digital signal processor). The processor circuit 500 is configured to execute computer program instructions from the functional modules 522 of the memory device(s) 520, described below as a computer readable medium, to perform at least some of the operations and methods of described herein as being performed by a network node. The network interface 530 communicates with other network nodes and/or a core network.

As discussed above, a network node may be a radio network node or a core network node. A radio network node, e.g., a base station, eNodeB, a remote radio head, a remote radio unit, a relay, a location management unit, may thus include transceiver 510. A core network node, e.g., a network monitoring and configuration node, an operational support system node, an operation and maintenance node, a minimization of drive tests node, a self organized network node, a positioning server/node, a mobility management entity, a gateway node, a macro node, may omit the transceiver 510.

4.0 Examples of Embodiments 4.1 Examples of Embodiments in a Wireless Device (UE)

According to some embodiments, a method in a wireless device may be provided to support positioning with different antenna transmission schemes. The method may include determining (block 600) an antenna transmission scheme used by at least one cell on whose radio signals the wireless device performs a positioning measurement, and adapting (block 604) a measurement procedure to compensate for potential measurement error associated with the antenna transmission scheme.

Determining may include determining whether more than one transmit antenna is used to transmit the radio signal used by the wireless device for the positioning measurement. Moreover, the radio signals may include periodically transmitted positioning reference signals, PRS.

Adapting the measurement procedure may include at least one of applying compensation to a positioning measurement, combining two or more samples or measurement components to be used for a positioning measurement, and/or signaling information associated with the determined antenna transmission scheme to a network node.

Determining the antenna transmission scheme may include determining the antenna transmission scheme based on signaling received from a network node or from a second wireless device.

The method may further include communicating (block 800) to a network node or a second wireless device an indication of an ability of the wireless device to deal with any one or more of a capability of performing positioning measurements on cells with different antenna transmission schemes or specific antenna transmission schemes, a capability of performing positioning measurements on cells with different transmission time characteristics or specific transmission time characteristics due to a difference in transmission times between different transmit antennas, a capability of autonomously determining an antenna transmission scheme used in a cell, and/or a capability of applying a compensation or adaptation to compensate an error in a positioning measurement performed on a cell using a certain antenna transmission scheme.

Adapting the measurement procedure may include reporting measurement results to a network node or a second wireless device and informing the network node or the second wireless device of a type of adaptation applied to a positioning measurement.

The method may also include calculating (block 602) potential measurement error associated with the antenna transmission scheme that was determined.

In addition, the method may include determining (block 700) whether to adapt the measurement procedure based on any one or more of radio conditions, wireless device speed, perceived measurement accuracy, transmission bandwidth, pre-defined rules, explicit indication received from a network node, and/or a degree of proximity and/or distance to the node or antennas transmitting the signals used to perform the positioning measurement. Adapting the measurement procedure may also include conditionally adapting the measurement procedure responsive to determining to adapt the measurement procedure.

Adapting the measurement procedure may include adapting a positioning measurement to meet at least one pre-defined positioning measurement requirements associated with the antenna transmission schemes.

In addition, the antenna transmission scheme may be determined based on one or more of signaling received from a network node indicative of an antenna transmission scheme of one or more transmit nodes transmitting radio signals measured for positioning, signaling received from a network node indicative of whether antenna transmission schemes of transmitting nodes are the same or different, an indication of a transmission time difference between different antennas of a multi-antenna system, autonomous determination based on a delay spread of radio signals, autonomous determination based on a number of strong correlation peaks indicative of more than one signal arriving at different times, association with an antenna transmission scheme used for radio signals, implicit determination based on a pre-defined rule, and/or implicit determination based on historical data.

The antenna transmission scheme may be a transmission time characteristic.

The method may also include communicating (block 900) to a network node or a second wireless device at least one of whether any type of adaptation in measurement procedure is applied to a positioning measurement, whether compensation has been applied, whether a measurement has taken into account the antenna transmission scheme used in the cell on whose signal the positioning measurement is done by the wireless device, and an amount of compensation applied to a reported positioning measurement.

According to some other embodiments, a wireless device (100) capable of supporting positioning with different antenna transmission schemes may be provided. The wireless device may include a transceiver (410) configured to communicate with a radio network node, and a processor circuit (400) coupled to the transceiver. The processor circuit may be configured to execute computer program instructions to determine an antenna transmission scheme used by at least one cell on whose radio signals the wireless device performs a positioning measurement, and adapt a measurement procedure to compensate for potential measurement error associated with the antenna transmission scheme.

The processor circuit may be further configured to execute computer program instructions to determine the antenna transmission scheme by determining whether more than one transmit antenna is used to transmit the radio signal used by the wireless device for the positioning measurement. Moreover, the radio signals may include periodically transmitted positioning reference signals, PRS.

The processor circuit may be configured to execute computer program instructions to adapt the measurement procedure by at least one of applying compensation to a positioning measurement, combining two or more samples or measurement components to be used for a positioning measurement, and/or signaling information associated with the determined antenna transmission scheme to a network node.

The processor circuit may be configured to execute computer program instructions to determine the antenna transmission scheme based on signaling received from a network node or from a second wireless device.

The processor circuit may be further configured to execute computer program instructions to communicate to a network node or a second wireless device an indication of an ability of the wireless device to deal with any one or more of a capability of performing positioning measurements on cells with different antenna transmission schemes or specific antenna transmission schemes, a capability of performing positioning measurements on cells with different transmission time characteristics or specific transmission time characteristics due to a difference in transmission times between different transmit antennas, a capability of autonomously determining an antenna transmission scheme used in a cell, and/or a capability of applying a compensation or adaptation to compensate an error in a positioning measurement performed on a cell using a certain antenna transmission scheme.

The processor circuit may be configured to execute computer program instructions to adapt the measurement procedure by reporting measurement results to a network node or a second wireless device and informing the network node or the second wireless device of a type of adaptation applied to a positioning measurement.

The processor circuit may be further configured to execute computer program instructions to calculate potential measurement error associated with the antenna transmission scheme that was determined.

The processor circuit may be further configured to execute computer program instructions to determine whether to adapt the measurement procedure based on any one or more of radio conditions, wireless device speed, perceived measurement accuracy, transmission bandwidth, pre-defined rules, explicit indication received from a network node, and/or a degree of proximity and/or distance to the node or antennas transmitting the signals used to perform the positioning measurement, and to adapt the measurement procedure by conditionally adapting the measurement procedure responsive to determining to adapt the measurement procedure.

The processor circuit may be configured to adapt the measurement procedure by adapting a positioning measurement to meet at least one pre-defined positioning measurement requirements associated with the antenna transmission schemes.

The processor circuit may be configured to determine the antenna transmission scheme based on one or more of signaling received from a network node indicative of an antenna transmission scheme of one or more transmit nodes transmitting radio signals measured for positioning, signaling received from a network node indicative of whether antenna transmission schemes of transmitting nodes are the same or different, an indication of a transmission time difference between different antennas of a multi-antenna system, autonomous determination based on a delay spread of radio signals, autonomous determination based on a number of strong correlation peaks indicative of more than one signal arriving at different times, association with an antenna transmission scheme used for radio signals, implicit determination based on a pre-defined rule, and/or implicit determination based on historical data.

The antenna transmission scheme may include a transmission time characteristic.

The processor circuit may be further configured to execute computer program instructions to communicate to a network node or a second wireless device at least one of whether any type of adaptation in measurement procedure is applied to a positioning measurement, whether compensation has been applied, whether a measurement has taken into account the antenna transmission scheme used in the cell on whose signal the positioning measurement is done by the wireless device, and an amount of compensation applied to a reported positioning measurement.

4.2 Examples of embodiments in a positioning server

According to some embodiments, a method in a positioning server (200) may support positioning when different antenna transmission schemes can be used. The method may include determining (block 1000) an antenna transmission scheme of a radio node, where the antenna transmission scheme is applied to transmit radio signals to be used for positioning, and using (block 1002) the determined antenna transmission scheme to perform positioning computations and/or configuring positioning measurements.

Using the determined antenna transmission scheme to perform positioning computations may include signaling the determined antenna transmission scheme to a wireless device and/or a network node.

The method may also include receiving (block 1100) wireless device capability related to wireless device support of antenna transmission schemes for positioning and/or receiving an antenna transmission scheme configuration from a network node or a wireless device.

In addition, the method may include adapting (block 1102) positioning assistance data based on the received device capability.

Using the determined antenna transmission scheme to perform positioning computations may include adapting positioning assistance data.

The positioning assistance data may include one or more of a radio signal bandwidth, a signal periodicity, and/or a number of positioning subframes in a positioning occasion.

Using the determined antenna transmission scheme to perform positioning computations may include applying a compensation to a measurement result received from a wireless device.

The method may also include receiving (block 1100) a wireless device capability related to support for antenna transmission schemes for positioning, wherein the wireless device capability comprises at least one of a capability of performing positioning measurements on cells with different antenna transmission schemes or specific antenna transmission schemes, a capability of performing positioning measurements on cells with different transmission time characteristics or specific transmission time characteristics due to differences in transmission times between transmit antennas, a capability of autonomously determining an antenna transmission scheme used in a cell, and/or a capability of applying a compensation or adaptation to compensate an error in a positioning measurement performed on a cell using a certain antenna transmission scheme.

The method may also include processing measurements received from a wireless device based on the wireless device capability.

According to some other embodiments, a positioning server (200) may be capable of supporting positioning when different antenna transmission schemes can be used. The positioning service may include a processor circuit (500) configured to execute computer program instructions to determine an antenna transmission scheme of a radio node, where the antenna transmission scheme is applied to transmit radio signals to be used for positioning, and to use the determined antenna transmission scheme to perform positioning computations.

The processor circuit may be configured to use the determined antenna transmission scheme to perform positioning computations by signaling the determined antenna transmission scheme to a wireless device and/or a network node.

The processor circuit may be further configured to execute computer program instructions to receive wireless device capability related to wireless device support of antenna transmission schemes for positioning and/or receiving an antenna transmission scheme configuration from a network node or a wireless device. The processor circuit may also be configured to execute computer program instructions to adapt positioning assistance data based on the received device capability.

The processor circuit may be configured to use the determined antenna transmission scheme to perform positioning computations by adapting positioning assistance data. The positioning assistance data may include one or more of a radio signal bandwidth, a signal periodicity, and/or a number of positioning subframes in a positioning occasion.

The processor circuit may be configured to use the determined antenna transmission scheme to perform positioning computations by applying a compensation to a measurement result received from a wireless device.

The processor circuit may be further configured to execute computer program instructions to receive a wireless device capability related to support for antenna transmission schemes for positioning, wherein the wireless device capability comprises at least one of a capability of performing positioning measurements on cells with different antenna transmission schemes or specific antenna transmission schemes, a capability of performing positioning measurements on cells with different transmission time characteristics or specific transmission time characteristics due to differences in transmission times between transmit antennas, a capability of autonomously determining an antenna transmission scheme used in a cell, and/or a capability of applying a compensation or adaptation to compensate an error in a positioning measurement performed on a cell using a certain antenna transmission scheme. In addition, the processor circuit may be configured to execute computer program instructions to process measurements received from a wireless device based on the wireless device capability.

4.3 Examples of Embodiments in a Radio Network Node

According to some embodiments, a method in a radio network node (200) may be provided to supporting positioning with different antenna transmission schemes. The method may include receiving (block 1100) wireless device capability related to the wireless device support of antenna transmission schemes for positioning and/or receiving an antenna transmission scheme configuration from a network node different than the radio node, and adaptively configuring (block 1102) an antenna transmission scheme for positioning measurements.

The wireless device capability may include at least one of a capability of performing positioning measurements on cells with different antenna transmission schemes or specific antenna transmission schemes, a capability of performing positioning measurements on cells with different transmission time characteristics or specific transmission time characteristics due to differences in transmission times between transmit antennas, a capability of autonomously determining an antenna transmission scheme used in a cell, and/or a capability of applying a compensation or adaption to compensate an error in a positioning measurement performed on a cell using a certain antenna transmission scheme.

Adaptively configuring the antenna transmission scheme may include selecting and configuring the antenna transmission scheme for positioning based on the wireless device capability.

Adaptively configuring the antenna transmission scheme may include configuring the antenna transmission scheme based on an instruction or configuration received from a network node. In addition, the method may include communicating (block 1202) the antenna transmission scheme for positioning to a network node different than the radio node.

According to some other embodiments, a radio network node (200) may be capable of supporting positioning with different antenna transmission schemes. The transmitting radio node may include a transceiver (510) configured to communicate with a wireless device, and a processor circuit (500) coupled to the transceiver. The processor circuit may be configured to execute computer program instructions to receive wireless device capability related to the wireless device support of antenna transmission schemes for positioning and/or receive an antenna transmission scheme configuration from a network node different than the radio node, and to adaptively configure an antenna transmission scheme for positioning measurements.

The wireless device capability may include at least one of a capability of performing positioning measurements on cells with different antenna transmission schemes or specific antenna transmission schemes, a capability of performing positioning measurements on cells with different transmission time characteristics or specific transmission time characteristics due to differences in transmission times between transmit antennas, a capability of autonomously determining an antenna transmission scheme used in a cell, and/or a capability of applying a compensation or adaption to compensate an error in a positioning measurement performed on a cell using a certain antenna transmission scheme.

The processor circuit may be further configured to adaptively configure the antenna transmission scheme by selecting and configuring the antenna transmission scheme for positioning based on the wireless device capability.

The processor circuit may be further configured to adaptively configuring the antenna transmission scheme by configuring the antenna transmission scheme based on an instruction or configuration received from a network node.

In addition, the processor circuit may be further configured to execute computer program instructions to communicate the antenna transmission scheme for positioning to a network node different than the radio node.

Further Definitions and Embodiments

In the above-description of various embodiments, it is to be understood that the terminology used herein is for the purpose of describing particular embodiments only and is not intended to be limiting of embodiments. Unless otherwise defined, all terms (including technical and scientific terms) used herein have the same meaning as commonly understood by one of ordinary skill in the art to which present embodiments belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When a node is referred to as being "connected", "coupled", "responsive", or variants thereof to another node, it can be directly connected, coupled, or responsive to the other node or intervening nodes may be present. In contrast, when an node is referred to as being "directly connected", "directly coupled", "directly responsive", or variants thereof to another node, there are no intervening nodes present. Like numbers refer to like nodes throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, nodes, steps, components or functions but does not preclude the presence or addition of one or more other features, integers, nodes, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present embodiments. The same reference numerals or the same reference designators denote the same or similar elements throughout the specification.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-eRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of present embodiments. All such variations and modifications are intended to be included herein within the scope of present embodiments.

ABBREVIATIONS

3GPP 3$^{rd}$ Generation Partnership Project
BS Base Station
CRS Cell-specific Reference Signal
DL Downlink
eNodeB evolved Node B
E-SMLC Evolved SMLC
HSPA High Speed Packet Access
LTE Long-Term Evolution
LMU Location Measurement Unit
MDT Minimization of Drive Tests
MIMO Multiple Input Multiple Output
MME Mobility Management Entity
OTDOA Observed Time Difference of Arrival
PCI Physical Cell Identity
PLMN Public Land Mobile Network
PRS Positioning Reference Signals
RF Radio Frequency
RRC Radio Resource Control
RSRP Reference Signal Received Power
RSRQ Reference Signal Received Quality
RSSI Received Signal Strength Indicator
RSTD Reference Signal Time Difference
RTOA Relative Time of Arrival
RTT Round Trip Time
Rx Receive
SINR Signal-to-Interference Ratio
SLP SUPL Location Platform
SON Self Organizing Network
SRS Sounding Reference Signals
SUPL Secure User Plane Location
TDOA Time Difference of Arrival
Tx Transmit
UE User Equipment
UL Uplink
ULP User-plane Location Protocol
UMTS Universal Mobile Telecommunications System

The invention claimed is:

1. A method in a wireless device to support positioning with different antenna transmission schemes, the method comprising:
   determining, by the wireless device, an antenna transmission scheme used by at least one cell, wherein the wireless device performs a positioning measurement on radio signals of the at least one cell, wherein determining the antenna transmission scheme comprises determining whether more than one transmit antenna is used by one cell of the at least one cell to transmit the radio signals; and
   adapting, by the wireless device, a measurement procedure to compensate for potential measurement error associated with the antenna transmission scheme based on determining whether more than one transmit antenna is used by the one cell to transmit the radio signals;
   wherein adapting the measurement procedure comprises reporting measurement results to a network node or a second wireless device and informing the network node or the second wireless device of a type of adaptation applied to a positioning measurement.

2. The method of claim 1, wherein the radio signals comprise periodically transmitted positioning reference signals (PRS).

3. The method of claim 1, wherein adapting the measurement procedure comprises at least one of: applying compensation to a positioning measurement, combining two or more samples or measurement components to be used for a positioning measurement, and signaling information associated with the determined antenna transmission scheme to a network node.

4. The method of claim 1, wherein determining the antenna transmission scheme comprises determining the antenna transmission scheme based on signaling received from a network node or from a second wireless device.

5. The method of claim 1, further comprising:
   communicating to a network node or a second wireless device an indication of an ability of the wireless device to deal with one or more of: a capability of performing positioning measurements on cells with different antenna transmission schemes or specific antenna transmission schemes, a capability of performing positioning measurements on cells with different transmission time characteristics or specific transmission time characteristics due to a difference in transmission times between different transmit antennas, a capability of autonomously determining an antenna transmission scheme used in a cell, and a capability of applying a compensation or adaptation to compensate an error in a positioning measurement performed on a cell using a certain antenna transmission scheme.

6. The method of claim 1, further comprising:
   calculating potential measurement error associated with the antenna transmission scheme that was determined.

7. The method of claim 1, further comprising:
   determining whether to adapt the measurement procedure based on any one or more of radio conditions, wireless device speed, perceived measurement accuracy, transmission bandwidth, pre-defined rules, explicit indication received from a network node, and/or a degree of proximity and/or distance to a node or an antenna transmitting the radio signals used to perform the positioning measurement;

wherein adapting the measurement procedure comprises conditionally adapting the measurement procedure responsive to determining to adapt the measurement procedure.

8. The method of claim 1, wherein adapting the measurement procedure comprises adapting a positioning measurement to meet at least one pre-defined positioning measurement requirements associated with the antenna transmission schemes.

9. The method of claim 1, comprising determining the antenna transmission scheme based on one or more of: signaling received from a network node indicating an antenna transmission scheme of one or more transmit nodes transmitting radio signals measured for positioning, signaling received from a network node indicating that antenna transmission schemes of two or more transmitting nodes are a same antenna transmission scheme or different antenna transmission schemes, an indication of a transmission time difference between different antennas of a multi-antenna system, an autonomous determination based on a delay spread of radio signals, an autonomous determination based on a number of strong correlation peaks indicating more than one signal arriving at different times, an association with an antenna transmission scheme used for radio signals, an implicit determination based on a pre-defined rule, and an implicit determination based on historical data.

10. The method of claim 1, wherein the antenna transmission scheme comprises a transmission time characteristic.

11. The method of claim 1, further comprising:
communicating to a network node or a second wireless device at least one of: whether any type of adaptation in measurement procedure is applied to a positioning measurement, whether compensation has been applied, whether a measurement has taken into account the antenna transmission scheme used in the cell on whose signal the positioning measurement is done by the wireless device, and an amount of compensation applied to a reported positioning measurement.

12. The method of claim 1 wherein the antenna transmission scheme comprises a multiple antenna transmission scheme.

13. The method of claim 12 wherein the multiple antenna transmission scheme comprises at least one of a Multiple Input Multiple Output (MIMO) transmission scheme, a transmit diversity transmission scheme, and a transmit beamforming transmission scheme.

14. A method in a positioning server supporting positioning when different antenna transmission schemes can be used, the method comprising:
determining, by the position server, a multiple antenna transmission scheme of a radio network node, where the multiple antenna transmission scheme is applied by the radio network node to transmit radio signals to be used for positioning; and
using, by the position server, the determined multiple antenna transmission scheme to perform positioning computations and/or configure positioning measurements, wherein using the determined multiple antenna transmission scheme comprises receiving a wireless device capability related to support for multiple antenna transmission schemes for positioning and processing measurements received from a wireless device based on the wireless device capability;
wherein using the determined multiple antenna transmission scheme to perform positioning computations and/or to configure positioning measurements comprises receiving measurement results from the wireless device and receiving a type of adaptation applied to a positioning measurement by the wireless device.

15. The method of claim 14 wherein using the determined multiple antenna transmission scheme to perform positioning computations comprises signaling the determined multiple antenna transmission scheme to a wireless device and/or a network node.

16. The method of claim 14 further comprising:
receiving wireless device capability related to wireless device support of multiple antenna transmission schemes for positioning and/or receiving a multiple antenna transmission scheme configuration from a network node or a wireless device, and
adapting positioning assistance data based on the received wireless device capability.

17. The method of claim 14, wherein using the determined multiple antenna transmission scheme to perform positioning computations comprises adapting positioning assistance data.

18. The method of claim 17 wherein the positioning assistance data comprises one or more of: a radio signal bandwidth, a signal periodicity, and a number of positioning subframes in a positioning occasion.

19. The method of claim 14, wherein using the determined multiple antenna transmission scheme to perform positioning computations comprises applying a compensation to a measurement result received from a wireless device.

20. The method of claim 14, wherein the wireless device capability comprises at least one of: a capability of performing positioning measurements on cells with different antenna transmission schemes or specific antenna transmission schemes, a capability of performing positioning measurements on cells with different transmission time characteristics or specific transmission time characteristics due to differences in transmission times between transmit antennas, a capability of autonomously determining an antenna transmission scheme used in a cell, and a capability of applying a compensation or adaptation to compensate an error in a positioning measurement performed on a cell using a certain antenna transmission scheme.

21. A method in a radio network node supporting positioning with different antenna transmission schemes, the method comprising:
receiving, by the radio network node from a wireless device, a wireless device capability related to wireless device support of antenna transmission schemes for positioning;
receiving, by the radio network node, a type of adaptation applied to a positioning measurement by the wireless device;
adaptively configuring, by the radio network node, an antenna transmission scheme for positioning measurements, wherein adaptively configuring the antenna transmission scheme comprises adaptively configuring the antenna transmission scheme based on the type of adaption applied to the positioning measurement by the wireless device; and
processing measurements received from the wireless device based on the wireless device capability related to wireless device support of antenna transmission schemes for positioning.

22. The method of claim 21 wherein the wireless device capability comprises at least one of: a capability of performing positioning measurements on cells with different antenna transmission schemes or specific antenna transmission schemes, a capability of performing positioning measurements on cells with different transmission time characteristics or specific transmission time characteristics due to differences in transmission times between transmit antennas, a capability of autonomously determining an antenna transmission scheme used in a cell, and a capability of applying a compensation or adaption to compensate an error in a positioning measurement performed on a cell using a certain antenna transmission scheme.

23. The method of claim 21, wherein adaptively configuring the antenna transmission scheme comprises selecting and configuring the antenna transmission scheme for positioning based on the wireless device capability related to wireless device support of antenna transmission schemes for positioning.

24. The method of claim 21, wherein adaptively configuring the antenna transmission scheme comprises configuring the antenna transmission scheme based on an instruction or configuration received from a network node.

25. The method of claim 21, further comprising:
communicating the antenna transmission scheme for positioning to the network node different than the radio network node.

26. A wireless device comprising:
a transceiver configured to communicate with a radio network node; and
a processor circuit coupled to the transceiver, wherein the processor circuit is configured to execute computer program instructions to:
determine an antenna transmission scheme used by at least one cell, wherein the wireless device performs a positioning measurement on radio signals of the at least one cell and wherein the wireless device determines whether more than one transmit antenna is used by one cell of the at least one cell to transmit the radio signals, and
adapt a measurement procedure to compensate for potential measurement error associated with the antenna transmission scheme based on determining whether more than one transmit antenna is used by the one cell to transmit the radio signals, wherein the computer program instructions to adapt the measurement procedure to compensate for potential measurement error associated with the antenna transmission scheme comprise computer program instructions to report measurement results to a network node or a second wireless device and inform the network node or the second wireless device of a type of adaptation applied to a positioning measurement.

27. A positioning server comprising:
a processor circuit configured to execute computer program instructions to:
determine multiple antenna transmission scheme of a radio network node, where the multiple antenna transmission scheme is applied to transmit radio signals to be used for positioning, and
use the determined multiple antenna transmission scheme to perform positioning computations, wherein using the determined multiple antenna transmission scheme comprises receiving a wireless device capability related to support for multiple antenna transmission schemes for positioning and processing measurements received from a wireless device based on the wireless device capability, wherein using the determined multiple antenna transmission scheme to perform positioning computations comprises receiving measurement results from the from the wireless device and receiving a type of adaptation applied to a positioning measurement by the wireless device.

28. The positioning server of claim 27, wherein the wireless device capability comprises at least one of a capability of performing positioning measurements on cells with different antenna transmission schemes or specific antenna transmission schemes, a capability of performing positioning measurements on cells with different transmission time characteristics or specific transmission time characteristics due to differences in transmission times between transmit antennas, a capability of autonomously determining an antenna transmission scheme used in a cell, and a capability of applying a compensation or adaptation to compensate an error in a positioning measurement performed on a cell using a certain antenna transmission scheme.

29. A radio network node comprising:
a transceiver configured to communicate with a wireless device; and
a processor circuit coupled to the transceiver, wherein the processor circuit is configured to execute computer program instructions to:
receive wireless device capability related to the wireless device support of antenna transmission schemes for positioning,
receive a type of adaptation applied to a positioning measurement by the wireless device,
adaptively configure an antenna transmission scheme for positioning measurements, wherein adaptively configuring the antenna transmission scheme comprises adaptively configuring the antenna transmission scheme based on the type of adaption applied to the positioning measurement by the wireless device, and
process measurements received from the wireless device based on the wireless device capability related to wireless device support of antenna transmission schemes for positioning.

30. The radio network node of claim 29, wherein the wireless device capability comprises at least one of a capability of performing positioning measurements on cells with different antenna transmission schemes or specific antenna transmission schemes, a capability of performing positioning measurements on cells with different transmission time characteristics or specific transmission time characteristics due to differences in transmission times between transmit antennas, a capability of autonomously determining an antenna transmission scheme used in a cell, and a capability of applying a compensation or adaptation to compensate an error in a positioning measurement performed on a cell using a certain antenna transmission scheme.

* * * * *